United States Patent [19]

Li

[11] Patent Number: 6,067,376
[45] Date of Patent: *May 23, 2000

[54] CLASSIFYING PIXELS OF AN IMAGE

[75] Inventor: David Li, West Roxbury, Mass.

[73] Assignee: Cognex Corporation, Natick, Mass.

[ * ] Notice: This patent issued on a continued prosecution application filed under 37 CFR 1.53(d), and is subject to the twenty year patent term provisions of 35 U.S.C. 154(a)(2).

[21] Appl. No.: 09/007,943

[22] Filed: Jan. 16, 1998

[51] Int. Cl.[7] .................................................. G06K 9/00
[52] U.S. Cl. ........................... 382/151; 382/146; 382/270
[58] Field of Search ..................... 382/141, 144, 382/145, 149, 151, 172, 192, 194, 224, 225, 270, 271, 146, 150, 147; 348/86, 87, 94, 95, 125, 126; 256/237.1, 237.5

[56] References Cited

U.S. PATENT DOCUMENTS

| | | | |
|---|---|---|---|
| 4,747,149 | 5/1988 | Umeda et al. | 382/271 |
| 4,888,646 | 12/1989 | Umeda et al. | 382/270 |
| 5,003,616 | 3/1991 | Orita et al. | 382/271 |
| 5,335,293 | 8/1994 | Vannelli et al. | 382/110 |
| 5,465,152 | 11/1995 | Bilodeau et al. . | |
| 5,550,763 | 8/1996 | Michael et al. . | |
| 5,574,668 | 11/1996 | Beaty . | |
| 5,574,801 | 11/1996 | Collet-Beillon . | |
| 5,652,658 | 7/1997 | Jackson et al. . | |
| 5,659,624 | 8/1997 | Fazzari et al. | 382/110 |
| 5,699,452 | 12/1997 | Vaidyanathan | 382/271 |

FOREIGN PATENT DOCUMENTS

WO 95/11519  4/1995  WIPO .

OTHER PUBLICATIONS

Deley et al., "Accurate Placement of Ball Grid Array Packages," reprinted from *Electronic Packaging & Production*, Apr. 1996, Cahners Publishing Company, Newton, MA, USA.

University of Waterloo Computer Graphics Lab, "Affine Transformations," http://www.undergrad.math.uwaterloo.ca/~cs488/In.HTML/Affinenode4.html, pp. 1–3.

Thomas, Jr., George B., "Chapter 14 Partial Differentiation," *Calculus and Analytic Geometry*, 1953, pp. 481–532, Addison–Wesley Publishing Company, Inc., Cambridge, MA, USA.

Cognex Corporation, Chapter 7 Mathematics, Coordinate Transformation by Pseudoinverse, *Cognex 3000/4000/5000 System Software*, 1996, pp. 204–210, Revision 7.4 590–0134, Natick, MA.

Cognex Corporation, "Chapter 1 Searching, Correlation Searching," *Cognex 3000/4000/5000 Vision Tools*, 1996, pp. 17–25, Revision 7.4 590–0136, Natick, MA.

Cognex Corporation, "Chapter 11 Ball Grid Array Device Inspection," *SMD Placement Guidance Product User's Manual*, 1996, pp. 213–246, Release 2.3.00 590–1039, Natick, MA.

Ballard, D.H., "Generalizing the Hough Transform to Detect Arbitrary Shapes*," *Pattern Recognition*, 1981, pp. 111–122, vol. 13, No. 2, Pergamon Press Ltd., UK.

ICOS Vision Systems, Inc., "ICOS 2–Dimensional BGA Inspection System," specification sheet, pp. 1–6, Waltham, MA, USA.

ICOS Vision Systems, Inc., "ICOS Component Checker for BGA Inspection," specification sheet, Waltham, MA, USA.

R.A. Hoogenboom, "Normalized Correlation Coefficient," http://www.wi.leidenuniv.nl/~rhoogenb/node26.html, pp. 1–2.

(List continued on next page.)

*Primary Examiner*—Bhavesh Mehta
*Attorney, Agent, or Firm*—Anthony L. Miele

[57] ABSTRACT

Pixels of an image are classified (e.g., into foreground and background pixels). In a set of possible values for the pixels, each value is able to serve as a threshold for classifying the pixels. From among the set, a value is selected for the threshold that causes the classification of the pixels to emphasize a characteristic of the image.

4 Claims, 25 Drawing Sheets

OTHER PUBLICATIONS

CARACAPPA, Ed., "On Improving BGA Reliability and Quality," *Surface Mount Technology Magazine,* Jun. 1997, pp. 44–46, Libertyville, IL, USA.

Silver et al., "Practical Golden Template Comparison," Cognex Corporation, Jun. 6, 1990, pp. 2–11, Needham, MA, USA.

"RVSI Vanguard Products," http://www.vai.net/products/products.htm, pp. 1–2.

"RVSI Vanguard VAi 5020," http:www.vai.net/products/prod01.htm, pp. 1–4.

"RVSI Vanguard VAi 5200/VAi 5300," http://www.vai.net/products/prod02.htm, pp. 1–4.

"RVSI Vanguard VAi 6300," http://www.vai.net/products/6300.htm, pp. 1–5.

Grimson et al., "On the Sensitivity of the Hough Transform for Object Recognition," IEEE Transactions on Pettern Anaylsis and Machine Intelligence, Mar. 1990, pp. 255–274, vol. 12, No. 3.

Fig. 8

| 2 | 2 | 2 | 2 | 2 | 2 | 2 | 2 | 2 | 2 | 2 | 2 | 2 | 2 | 2 | 2 | 2 | 2 | 2 |
|---|---|---|---|---|---|---|---|---|---|---|---|---|---|---|---|---|---|---|
| 2 | 2 | 2 | 2 | 2 | 2 | 2 | 2 | 2 | 2 | 2 | 2 | 2 | 2 | 2 | 2 | 2 | 2 | 2 |
| 2 | 2 | 2 | 2 | 2 | 2 | 2 | 2 | 2 | 2 | 2 | 2 | 2 | 2 | 5 | 5 | 2 | 2 | 2 |
| 2 | 2 | 2 | 2 | 2 | 2 | 2 | 2 | 2 | 2 | 2 | 2 | 2 | 5 | 5 | 5 | 5 | 2 | 2 |
| 2 | 2 | 2 | 2 | 2 | 2 | 2 | 2 | 2 | 2 | 2 | 2 | 5 | 6 | 5 | 6 | 6 | 6 | 2 |
| 2 | 2 | 2 | 5 | 5 | 2 | 2 | 2 | 2 | 2 | 2 | 2 | 5 | 5 | 7 | 7 | 6 | 6 | 2 |
| 2 | 2 | 5 | 5 | 6 | 6 | 2 | 2 | 2 | 2 | 2 | 2 | 2 | 6 | 6 | 6 | 6 | 2 | 2 |
| 2 | 5 | 5 | 5 | 6 | 6 | 6 | 2 | 2 | 2 | 2 | 2 | 2 | 2 | 6 | 6 | 2 | 2 | 2 |
| 2 | 6 | 6 | 7 | 7 | 6 | 6 | 2 | 2 | 2 | 2 | 2 | 2 | 2 | 2 | 2 | 2 | 2 | 2 |
| 2 | 2 | 6 | 6 | 6 | 6 | 2 | 2 | 2 | 2 | 2 | 2 | 2 | 2 | 2 | 2 | 2 | 2 | 2 |
| 2 | 2 | 2 | 6 | 6 | 2 | 2 | 2 | 2 | 2 | 2 | 2 | 2 | 2 | 2 | 2 | 2 | 2 | 2 |
| 2 | 2 | 2 | 2 | 2 | 2 | 2 | 2 | 2 | 2 | 2 | 2 | 2 | 2 | 2 | 2 | 2 | 2 | 2 |
| 2 | 2 | 2 | 2 | 2 | 2 | 2 | 2 | 2 | 2 | 2 | 2 | 2 | 2 | 2 | 2 | 2 | 2 | 2 |
| 2 | 2 | 2 | 2 | 2 | 2 | 2 | 2 | 2 | 2 | 2 | 2 | 2 | 2 | 2 | 2 | 2 | 2 | 2 |
| 2 | 2 | 2 | 2 | 2 | 2 | 2 | 2 | 2 | 2 | 2 | 2 | 2 | 2 | 2 | 2 | 2 | 2 | 2 |
| 2 | 2 | 2 | 2 | 2 | 2 | 2 | 2 | 2 | 2 | 2 | 2 | 2 | 2 | 2 | 2 | 2 | 2 | 2 |
| 2 | 2 | 2 | 2 | 2 | 2 | 2 | 2 | 2 | 2 | 2 | 2 | 2 | 2 | 2 | 2 | 2 | 2 | 2 |
| 2 | 2 | 2 | 2 | 2 | 2 | 2 | 2 | 2 | 2 | 2 | 2 | 2 | 2 | 2 | 2 | 2 | 2 | 2 |
| 2 | 2 | 2 | 2 | 2 | 2 | 2 | 2 | 2 | 2 | 2 | 2 | 2 | 2 | 2 | 2 | 2 | 2 | 2 |
| 2 | 2 | 2 | 2 | 2 | 2 | 2 | 5 | 6 | 2 | 2 | 2 | 2 | 2 | 2 | 2 | 2 | 2 | 2 |
| 2 | 2 | 2 | 2 | 2 | 2 | 6 | 6 | 6 | 6 | 2 | 2 | 2 | 2 | 2 | 2 | 2 | 2 | 2 |
| 2 | 2 | 2 | 2 | 2 | 6 | 6 | 7 | 7 | 6 | 6 | 2 | 2 | 2 | 2 | 2 | 2 | 2 | 2 |
| 2 | 2 | 2 | 2 | 2 | 6 | 7 | 8 | 8 | 7 | 6 | 2 | 2 | 2 | 2 | 2 | 2 | 2 | 2 |
| 2 | 2 | 2 | 2 | 2 | 2 | 7 | 7 | 7 | 7 | 2 | 2 | 2 | 2 | 2 | 2 | 2 | 2 | 2 |
| 2 | 2 | 2 | 2 | 2 | 2 | 2 | 7 | 7 | 2 | 2 | 2 | 2 | 2 | 2 | 2 | 2 | 2 | 2 |
| 2 | 2 | 2 | 2 | 2 | 2 | 2 | 2 | 2 | 2 | 2 | 2 | 2 | 2 | 2 | 2 | 2 | 2 | 2 |
| 2 | 2 | 2 | 2 | 2 | 2 | 2 | 2 | 2 | 2 | 2 | 2 | 2 | 2 | 2 | 2 | 2 | 2 | 2 |
| 2 | 2 | 2 | 2 | 2 | 2 | 2 | 2 | 2 | 2 | 2 | 2 | 2 | 2 | 2 | 2 | 2 | 2 | 2 |
| 2 | 2 | 2 | 2 | 2 | 2 | 2 | 2 | 2 | 2 | 2 | 2 | 2 | 2 | 2 | 2 | 2 | 2 | 2 |

Fig. 14

| POINT | X-COORD | Y-COORD | VECTORS TO NEAREST POINTS | | | |
|---|---|---|---|---|---|---|
| A | 94 | 70 | AB | AJ | AK | AM |
| B | 86 | 100 | BA | BC | BD | BJ |
| C | 78 | 128 | CB | CD | CE | CM |
| D | 106 | 134 | DC | DE | DB | DM |
| E | 136 | 139 | ED | EF | EM | EN |
| F | 165 | 144 | FN | FE | FG | FH |
| G | 195 | 150 | GF | GN | GH | GE |
| H | 203 | 120 | HN | HG | HI | HF |
| I | 210 | 90 | IH | IL | IN | IK |
| J | 138 | 98 | JK | JM | JL | JB |
| K | 150 | 90 | KJ | KL | KM | KA |
| L | 157 | 102 | LM | LK | LJ | LN |
| M | 145 | 110 | MJ | ML | MK | MN |
| N | 177 | 126 | NH | NF | NG | NL |

Fig. 16

| VECTOR | LENGTH | ANGLE | VECTOR | LENGTH | ANGLE |
|---|---|---|---|---|---|
| AB | 31 | 104 | HN | 28 | 164 |
| AJ | 52 | 33 | HG | 31 | 105 |
| AK | 60 | 20 | HI | 31 | 285 |
| AM | 65 | 38 | HF | 45 | 148 |
| BA | 31 | 284 | IH | 31 | 105 |
| BC | 29 | 106 | IL | 54 | 169 |
| BD | 39 | 61 | IN | 48 | 132 |
| BJ | 52 | 358 | IK | 60 | 180 |
| CB | 29 | 286 | JK | 14 | 329 |
| CD | 29 | 12 | JM | 14 | 59 |
| CE | 59 | 11 | JL | 19 | 12 |
| CM | 69 | 345 | JB | 52 | 178 |
| DC | 29 | 192 | KJ | 14 | 149 |
| DE | 30 | 10 | KL | 14 | 59 |
| DB | 39 | 241 | KM | 21 | 104 |
| DM | 46 | 329 | KA | 60 | 200 |
| ED | 30 | 190 | LM | 14 | 149 |
| EF | 29 | 10 | LK | 14 | 239 |
| EM | 30 | 285 | LJ | 19 | 192 |
| EN | 43 | 342 | LN | 31 | 51 |
| FN | 22 | 305 | MJ | 14 | 239 |
| FE | 29 | 190 | ML | 14 | 329 |
| FG | 31 | 11 | MK | 21 | 284 |
| FH | 45 | 328 | MN | 36 | 26 |
| GF | 31 | 191 | NH | 27 | 344 |
| GN | 30 | 233 | NF | 22 | 125 |
| GH | 31 | 285 | NG | 30 | 53 |
| GE | 60 | 191 | NL | 31 | 231 |

Fig. 22

| ALPHA, BETA LOCATION | ON/OFF |
|---|---|
| 0,0 | ON |
| 0,1 | ON |
| 0,2 | ON |
| 0,3 | OFF |
| 1,0 | OFF |
| 1,1 | OFF |
| 1,2 | ON |
| 1,3 | OFF |
| 2,0 | OFF |
| 2,1 | ON |
| 2,2 | ON |
| 2,3 | OFF |
| 3,0 | OFF |
| 3,1 | OFF |
| 3,2 | ON |
| 3,3 | OFF |
| 4,0 | ON |
| 4,1 | ON |
| 4,2 | ON |
| 4,3 | OFF |
| 5,0 | OFF |
| 5,1 | OFF |
| 5,2 | OFF |
| 5,3 | OFF |

Fig. 26

| ALPHA, BETA LOCATION | ON/OFF |
|---|---|
| 0,0 | OFF |
| 0,1 | ON |
| 0,2 | OFF |
| 0,3 | OFF |
| 1,0 | OFF |
| 1,1 | ON |
| 1,2 | ON |
| 1,3 | OFF |
| 2,0 | OFF |
| 2,1 | OFF |
| 2,2 | OFF |
| 2,3 | OFF |

86

CLASSIFYING PIXELS OF AN IMAGE

BACKGROUND OF THE INVENTION

The invention relates to classifying pixels of an image.

A person responsible for inspecting a manufactured item (e.g., an electronic component) for defects typically learns about the item and objects included in the item (e.g., electrical terminals on an electronic component) by visually examining the item. When inspection is automated, information about the item is obtained by automated analysis of an image of the item. The obtained information may include the location of the objects included in the item and the size and shape of the objects. An automated inspection system typically obtains the location of each object by searching the image for a distinguishing characteristic of the object, such as a specific color or shape. If the image's coloring is difficult to predict (e.g., due to variations in the tint or intensity of the lighting used to illuminate the object) or the specific shape is present only in an altered form (e.g., due to a rotated orientation of the object as represented in the image), it may be difficult for the automated system to locate the object in the image.

Examples of manufactured items appropriate for inspection include ball grid array devices, micro-ball grid arrays, flip chips, and chip-scale packages (together called "BGAs"). BGAs share a common feature in that the contacts on the device are metallic balls that are mounted on one side of the device for forming electrical connections between the package's integrated circuit and a printed circuit board.

To work properly, the balls of BGAs should be properly located to connect to the pads on the circuit board. The balls also should be properly formed (i.e., should have a spherical shape and neither too much nor too little solder, to allow an acceptable electrical connection). The balls also should not be connected by extraneous solder or other material in the spaces between the balls. If these conditions are not met, the BGA may fail to make proper electrical connections or durable physical bonds.

Unlike traditional leaded devices that have contacts exposed on perimeters where some types of defects (e.g., solder bridges or missing solder) can be detected even after soldering, BGAs are harder to inspect after mounting on a circuit board. BGAs therefore are inspected before mounting, either in fully-assembled form or by inspection of ball arrays that are about to be attached to the packages of integrated circuits.

Inspections are done on other types of products, e.g., pill blister packs and candy sampler boxes.

SUMMARY OF THE INVENTION

In general, in one aspect, the invention features a method for classifying pixels of an image. The method includes: from among a set of possible values for the pixels, each value able to serve as a threshold for classifying the pixels, selecting for the threshold a value that causes the classification of the pixels to emphasize a characteristic of the image.

Implementations of the invention may include one or more of the following features. The method may further include testing each of the possible values for suitability as the threshold, and, in accordance with each value tested, classifying the pixels into foreground and background pixels. The foreground pixels may include groups of contiguous pixels, the method may further include forming sets of similarly-sized groups, the characteristic may include a count of the groups in the most populous set, and the value selected may produce the highest number for the count. Of the possible values for the threshold, the value selected may produce the highest number of similarly-sized groups of contiguous pixels. The pixels in each group may have values of at least the threshold value. Each group may correspond to a discrete object; and the method may further includes deriving the location of the discrete object from the group. The discrete object may include an electrical terminal, which may include a BGA ball.

In general, in another aspect, the invention features a method for classifying pixels of an image. The method includes, for each value in a set of possible values for the pixels, using the value to classify the pixels into foreground and background pixels, in the foreground pixels, finding groups of contiguous pixels, forming sets of similarly-sized groups, counting the number of groups in each set, determining a value-specific peak number being the number of groups in the most populous set; and, from the set of possible values, selecting the value for which the greatest value-specific peak number was determined; and accepting the foreground/background classification associated with the selected pixel.

Among the advantages of the invention are one or more of the following. An image processing system can locate discrete objects in an image even if the absolute size of each of the objects is unknown to the system, even if the objects are not uniform in shape, even if the objects are disposed among other objects of other sizes, and even if the tint or intensity of the lighting used to produce the image cannot be reliably predicted. A BGA inspection system provided with a digital image of a device under inspection can locate BGA balls on the device.

Other advantages and features will become apparent from the following description and from the claims.

BRIEF DESCRIPTION OF THE DRAWINGS

FIGS. 7–10 are illustrations of digital image data.

FIG. 14 is a diagram helpful for understanding the diagram of FIG. 13.

FIG. 16 is a diagram helpful for understanding the diagram of FIG. 15.

FIG. 22, 26 are on-off tables derived from the arrangement of FIG. 13.

DESCRIPTION OF THE PREFERRED EMBODIMENTS

Figure 1:
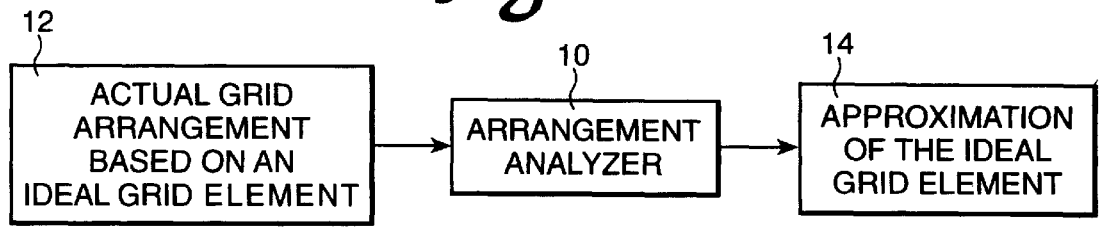
FIG. 1 is a block diagram showing an arrangement analyzer.

FIG. 1 shows arrangement analyzer 10 that derives an approximation 14 of an ideal grid element (e.g., two ideal vectors disposed at an angle) from an actual, imperfect grid arrangement 12, such as an arrangement of electrical terminals, e.g., solder balls on a ball grid array device. As described below, the approximation 14 is derived by exploiting the fact that the actual arrangement 12 includes multiple imperfect implementations of the ideal grid element, which implementations can be averaged or otherwise combined to create the approximation 14.

Figure 2:
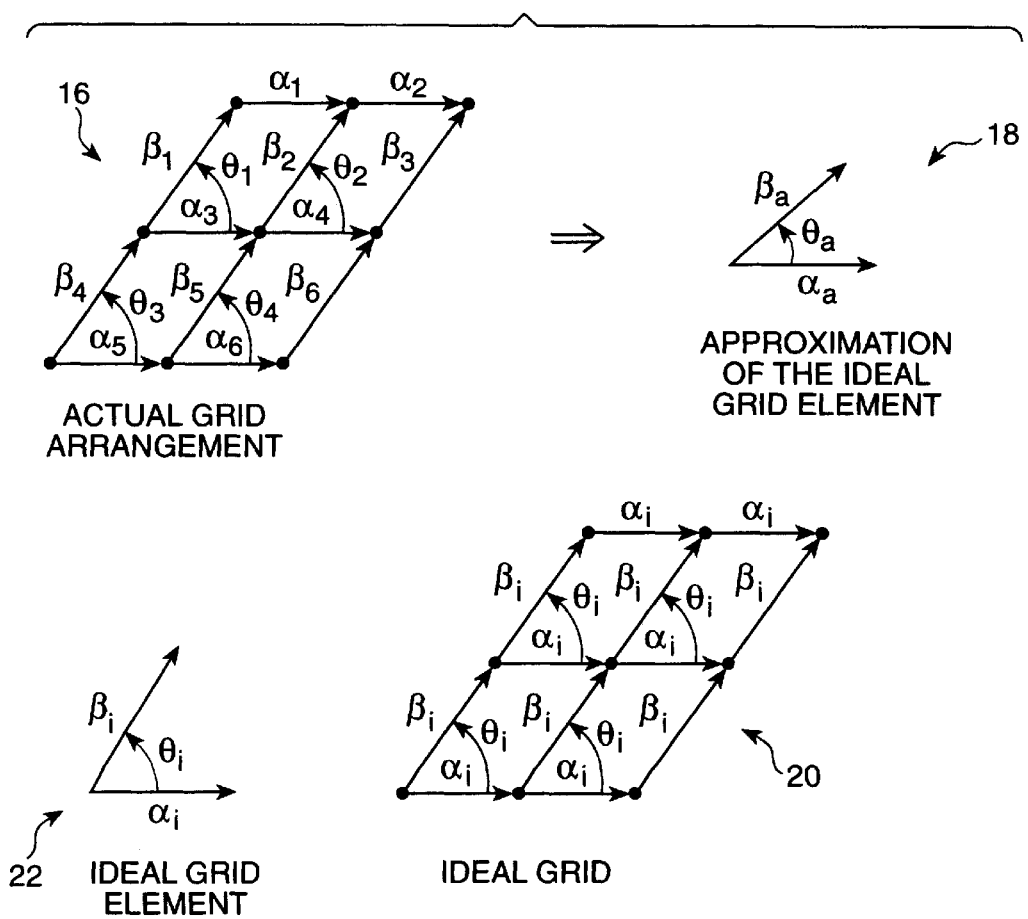
FIG. 2 is an illustration of an approximation produced by the arrangement analyzer.
Figure 3:
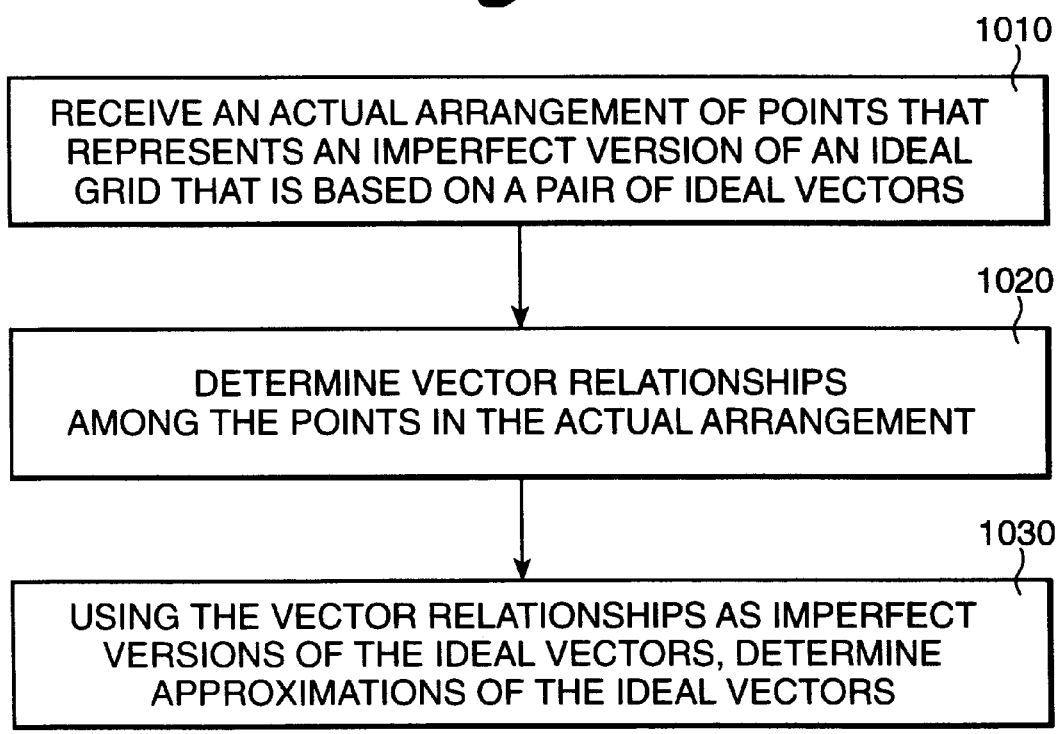
FIGS. 3 and 6 are flow diagrams of procedures.

With reference also to FIGS. 2–3, the arrangement analyzer 10 operates as follows where the ideal grid element is an ideal two-vector grid element (e.g., element 22) defined by two ideal vectors $\alpha_i$ and $\beta_i$ disposed at an ideal angle $\theta_i$. The analyzer 10 receives the actual arrangement 12 of points (e.g., arrangement 16) representing an imperfect version of an ideal grid (e.g., grid 20) that is based on the ideal two-vector grid element (step 1010). Vector relationships (e.g., vectors $\alpha_{1-6}$ and $\beta_{1-6}$ disposed at angles including angles $\theta_{1-4}$) are determined among the points in the actual arrangement 12 (step 1020). Using the vector relationships as imperfect versions of the ideal vectors disposed at the ideal angle, approximation vectors $\alpha_a$ and $\beta_a$ and approximation angle $\theta_a$ of the approximation grid element 14 (e.g., element 18) are determined (step 1030).

Figure 4:
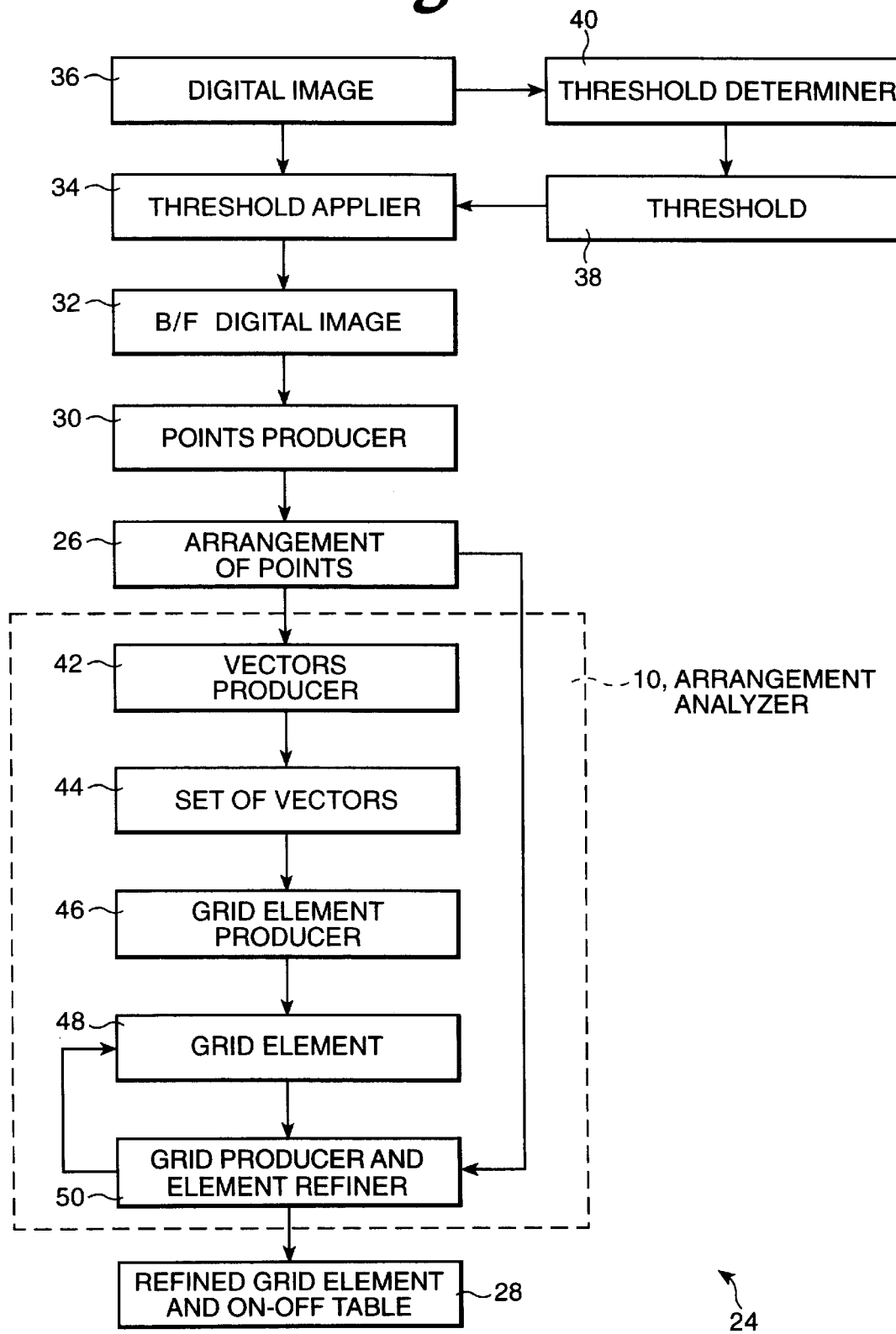
FIG. 4 is a block diagram of an image processing system.

FIG. 4 illustrates image processing system 24 that is described in more detail below in connection with a procedure 64. The image processing system 24 uses the arrangement analyzer 10 to detect regular patterns represented in the digital image. The arrangement analyzer 10 receives an arrangement of points 26 (including actual arrangement 12) and produces an approximation set 28 that includes the approximation grid element 14 (as refined by the analyzer 10) and an on-off table.

In the image processing system 24, the arrangement of points 26 used by the arrangement analyzer 10 is produced as follows. In accordance with a threshold 38 derived from a digital image 36 by a threshold determiner 40, a threshold applier 34 derives from the digital image 36 a background/foreground digital image 32 that exposes an arrangement of similarly-sized discrete objects. From the background/foreground digital image 32, a points producer 30 derives the arrangement of points 26 which corresponds to the arrangement of discrete objects.

In the arrangement analyzer 10, from the arrangement of points 26 a vectors producer 42 derives a set of vectors 44 represented in the arrangement, from which set a grid element producer 46 creates a grid element 48 that is tested against the arrangement of points 26 by a grid producer and element refiner 50.

Figure 5:
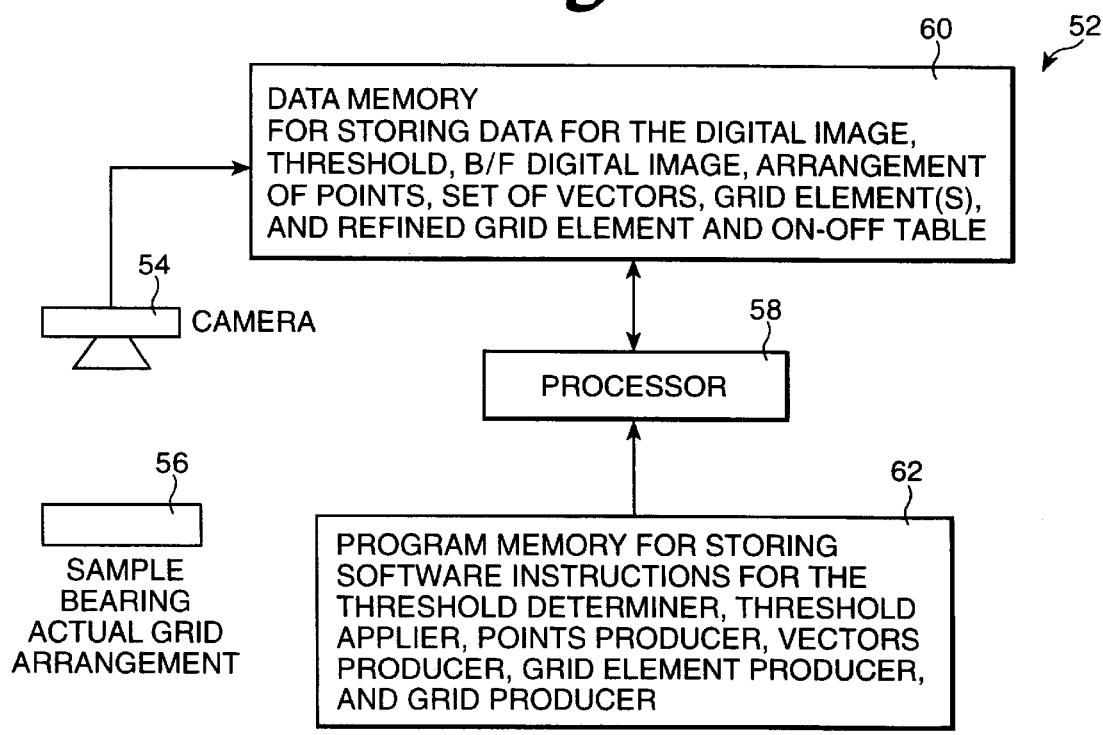
FIG. 5 is a block diagram of an implementation of the image processing system.

FIG. 5 shows implementation 52 of the image processing system 24, which implementation 52 includes a camera 54 for acquiring the digital image of a sample 56 (e.g., a ball grid array device) bearing the actual grid arrangement, a processor 58, a data memory 60, and a program memory 62. Software instructions are stored in the program memory 62 to cause the processor 58 to serve as the threshold determiner 40, threshold applier 34, points producer 30, vectors producer 42, grid element producer 46, and grid producer and element refiner 50.

Figure 6:
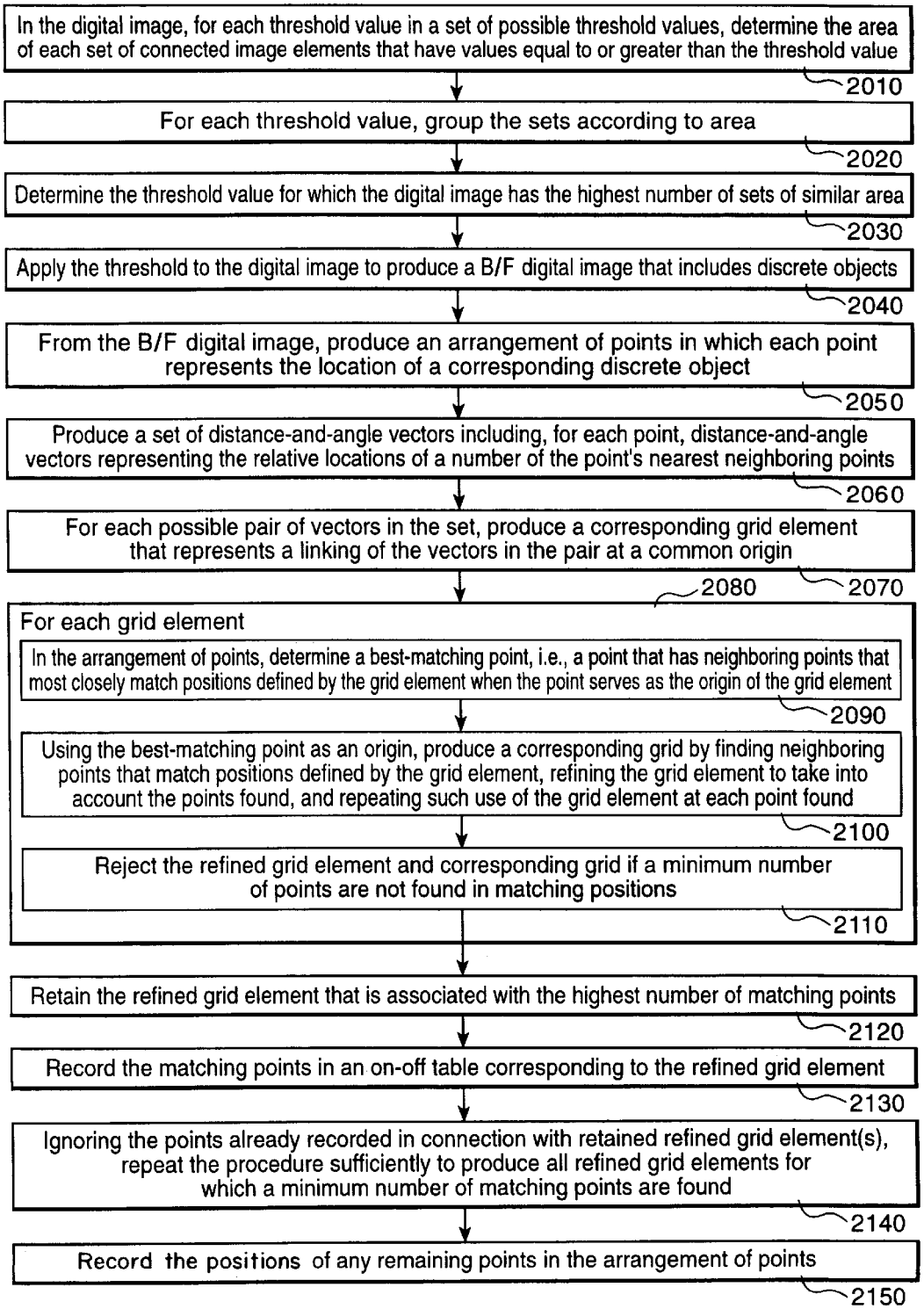
Figure 7:
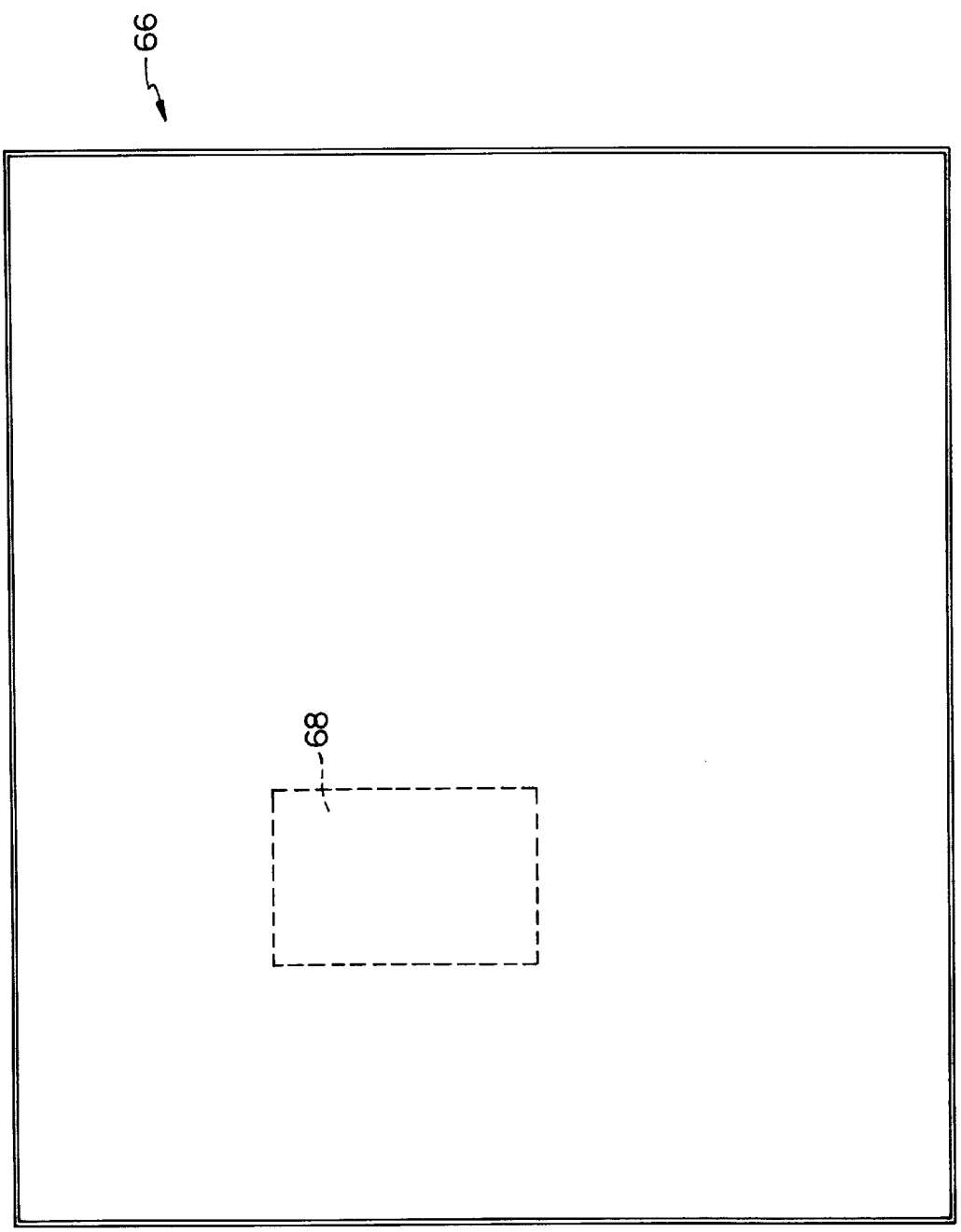

FIG. 6 shows procedure 64 (described below with reference to an example illustrated by FIGS. 7–26) executed by the processor 58 in accordance with the software instructions, to produce the refined grid element and on-off table 28 from the digital image 36, as shown in FIG. 4.

The digital image 36 (e.g., image 66 of FIG. 7 including a portion 68 shown in FIG. 8) includes image elements having respective values (e.g., elements 70, 72, 74 having respective values 6, 5, 2) each of which represents a characteristic such as a brightness level or a color. It is expected that the digital image 36 includes discrete objects (e.g., BGA balls) of similar size. As now described, to expose these discrete objects in the digital image 36, the threshold determiner 40 chooses a value for threshold 38 that emphasizes similar-sized sets of connected image elements, and the threshold applier 34 applies the threshold 38 to the digital image 36 to produce the background/foreground digital image 32 in which the similar-sized sets of image elements are in the foreground and the other image elements are in the background.

Figure 9:
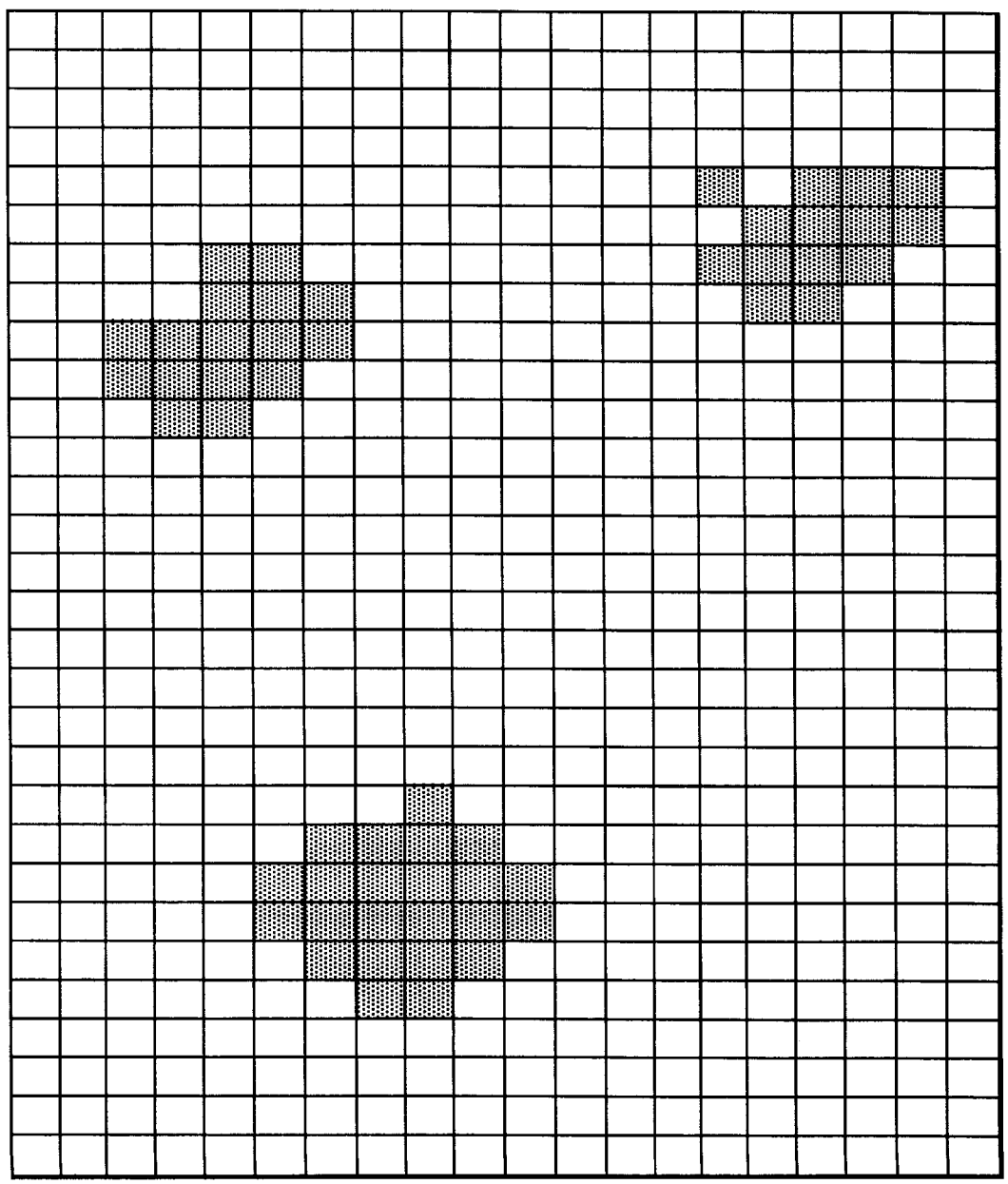
Figure 10:
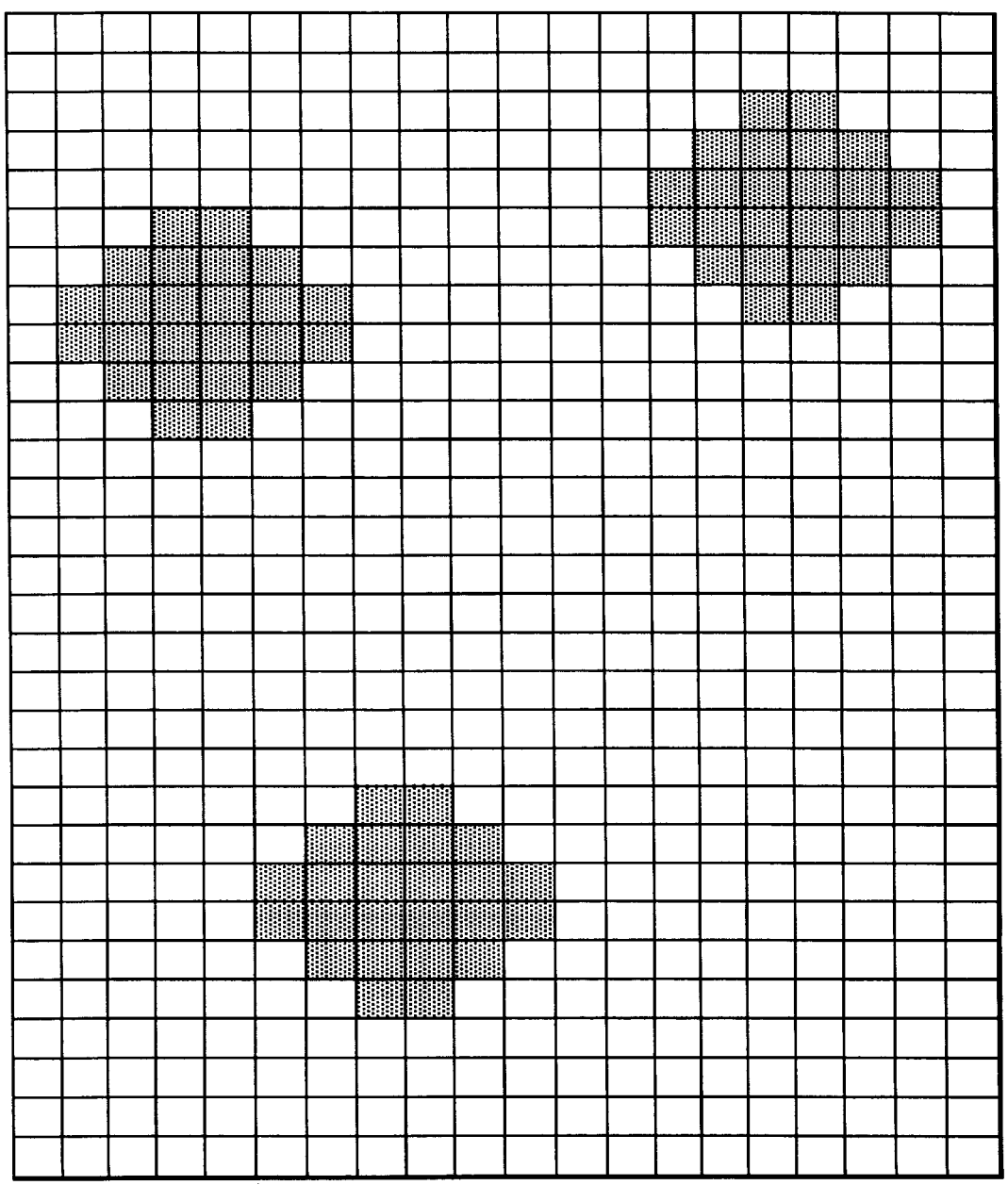
Figure 11A:
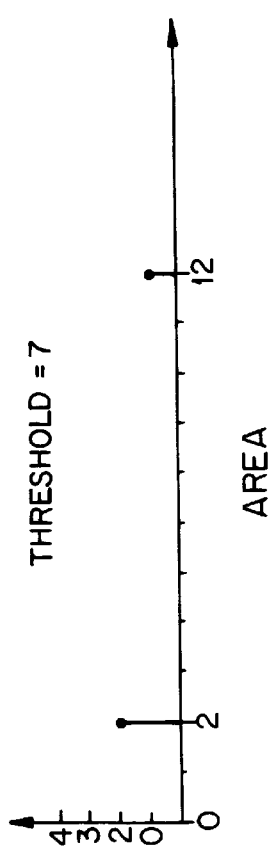
FIGS. 11A–11C are diagrams of histograms derived from the digital image data of FIGS. 7–10.
Figure 11B:
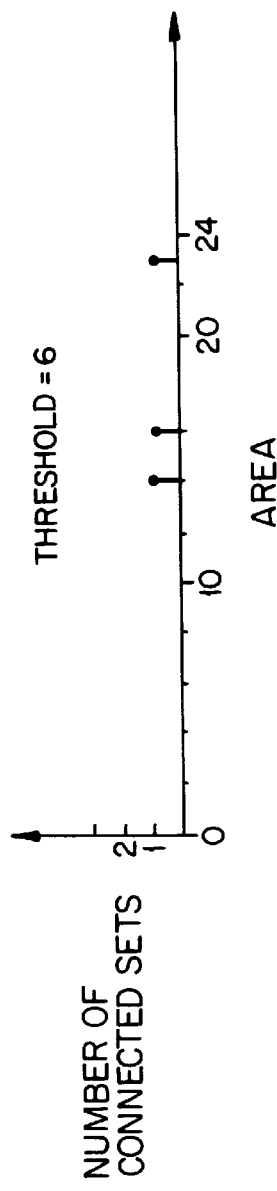
Figure 11C:
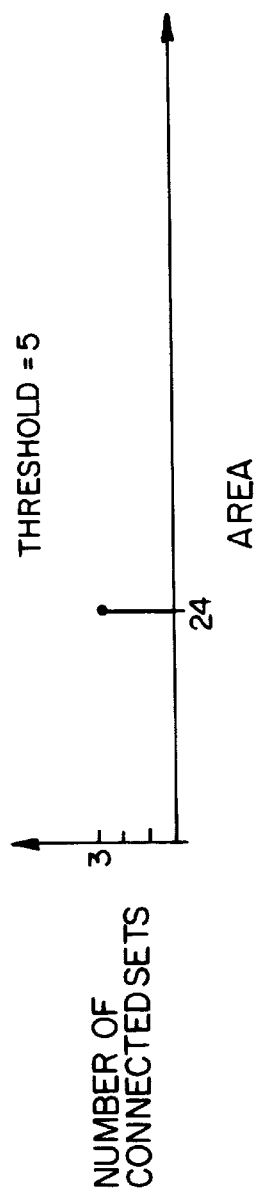
Figure 12:
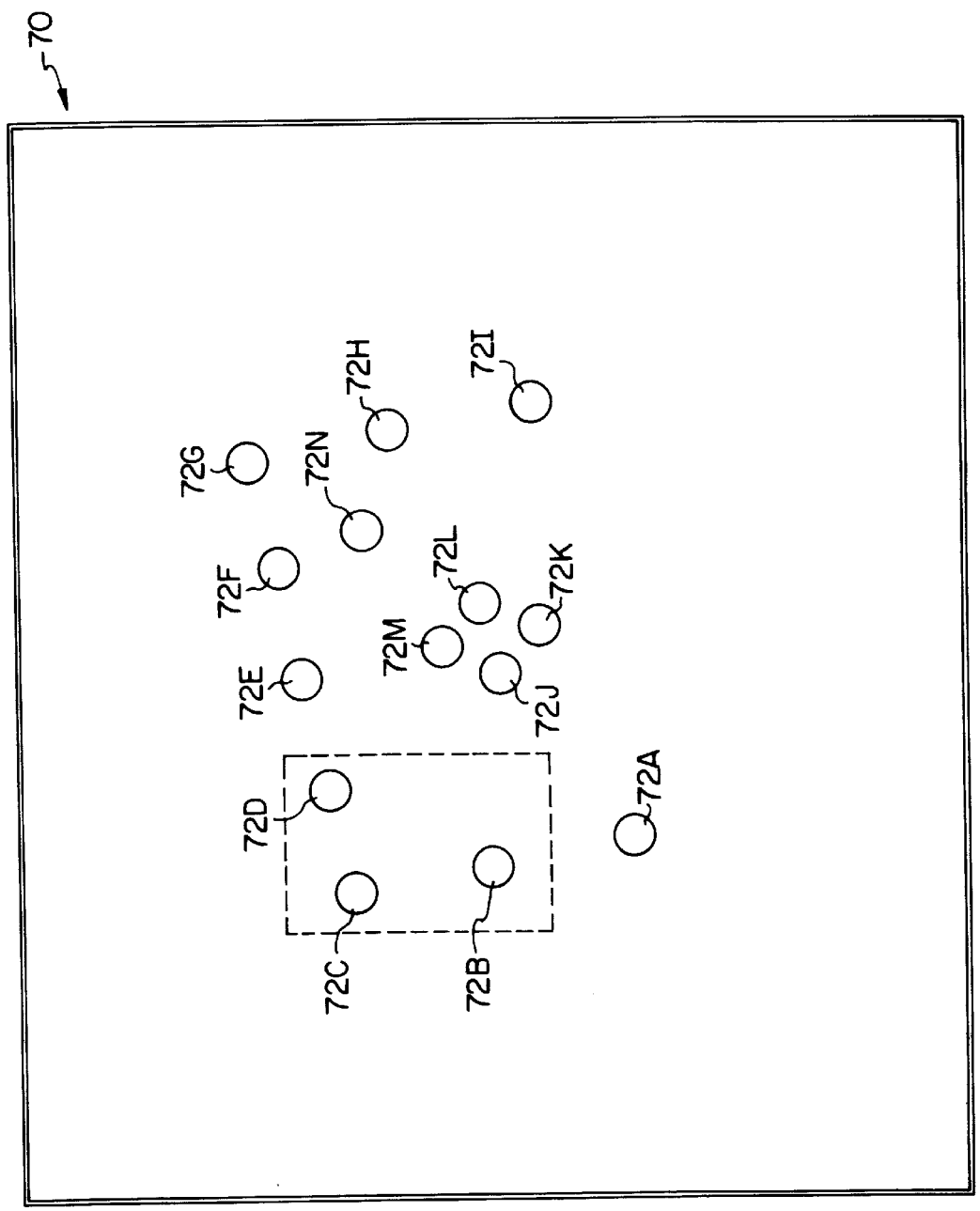
FIG. 12 is a diagram of background/foreground digital data derived from the digital image data of FIGS. 7–10.
Figure 13:
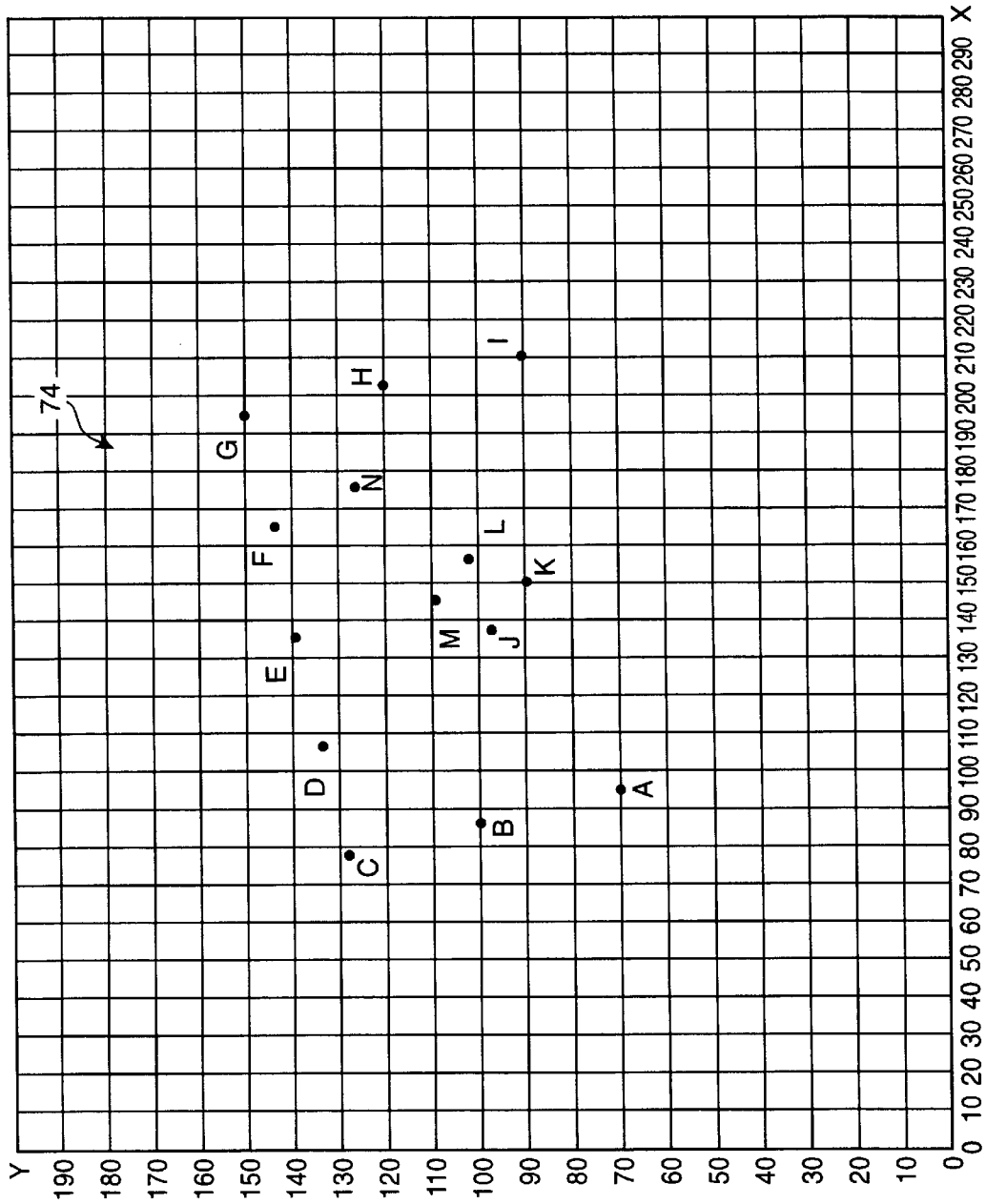
FIG. 13 is a diagram of an arrangement of points derived from the background/foreground digital data of FIG. 12.

In the digital image 36, for each threshold value in a set of possible threshold values (e.g., 5, 6, 7), the threshold determiner 40 determines the area of each set of connected (i.e., contiguous) image elements that have values equal to or greater than the threshold value (step 2010). For each threshold value, the sets are grouped by area (step 2020). For example, in the case of portion 68 (FIG. 8) which includes image elements having values 2, 5, 6, 7, and 8, if a threshold value of 7 is used, it is determined that portion 68 has two sets having an area of 2, and one set having an area of 12, as shown in an area histogram in FIG. 11A. The sets determined for threshold values 6 and 5 for portion 68 are shown in FIGS. 9 and 10, respectively, and in area histograms in FIGS. 11B and 11C, respectively.

The threshold determiner 40 determines the threshold value (i.e., 5 in the case of portion 68) for which the digital image 36 has the highest number of sets of similar area (step 2030).

The threshold applier 34 applies the threshold value to the digital image 36 to produce the background/foreground digital image 32 (e.g., image 70 of FIG. 12), which includes discrete objects (e.g., objects 72A–72N) in the foreground (step 2040). For each image element in the digital image 36, the background/foreground digital image 32 has a corresponding image element that has one of two values: a value associated with the background or a value associated with the foreground (e.g., 0 or 9, respectively).

The points producer 30 produces arrangement of points 26 (e.g., arrangement 74 of FIG. 13) in which each point represents a location of a corresponding discrete object of the background/foreground digital image (e.g., points A–N shown in FIG. 13 and listed in FIG. 14 that correspond to discrete objects 72A–72N, respectively) (step 2050). Each point is selected by determining an image element that represents a centroid of the corresponding discrete object. Alternatively, each point may be selected by determining the center of the smallest rectangle or circle that encloses the corresponding discrete object. The arrangement may exclude points corresponding to any discrete objects that fail to meet size or shape requirements.

The vectors producer 42 produces set of vectors 44 (e.g., a master table of vectors) by determining vectors from each point to a number (e.g., four) of the point's nearest neighboring points (step 2060). For example, the vectors shown in FIGS. 15 and 17 and listed in FIGS. 14 and 16 are produced for arrangement 74 of FIG. 13. For point A, the nearest four points are points B, J, K, and M, corresponding to vectors AB, AJ, AK, and AM, respectively.

Figure 15:
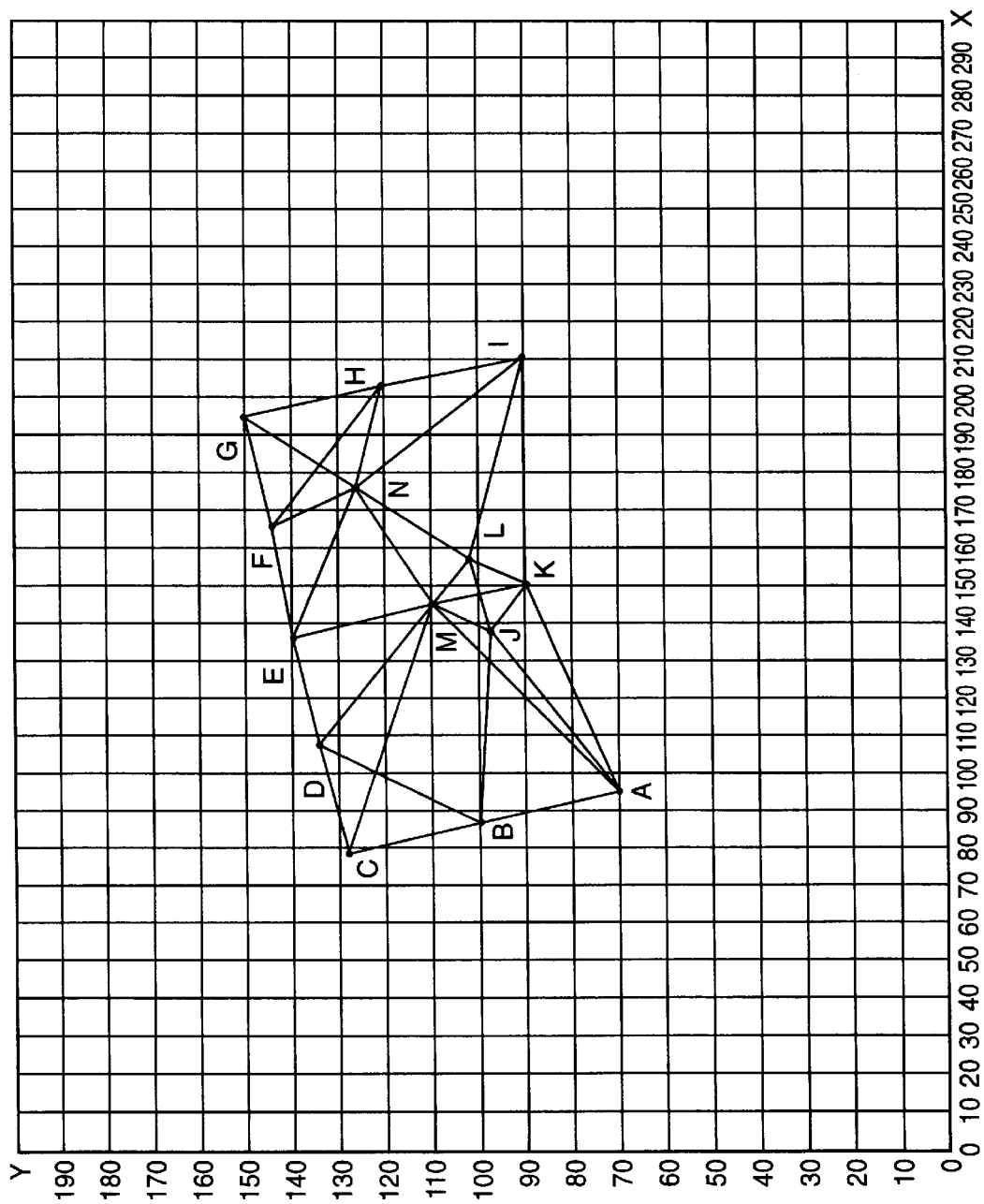
FIG. 15 is a diagram of vectors derived from the arrangement of FIG. 13.
Figure 15A:
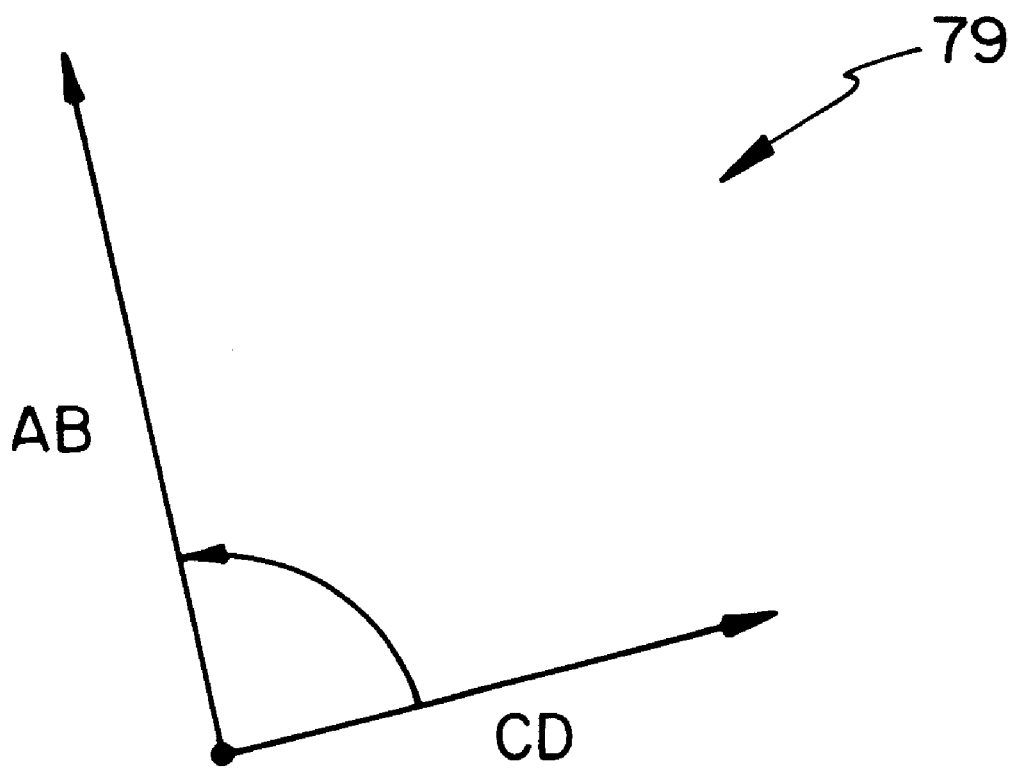
FIG. 15A is a diagram of a grid element derived from the vectors of FIG. 15.
Figure 17:
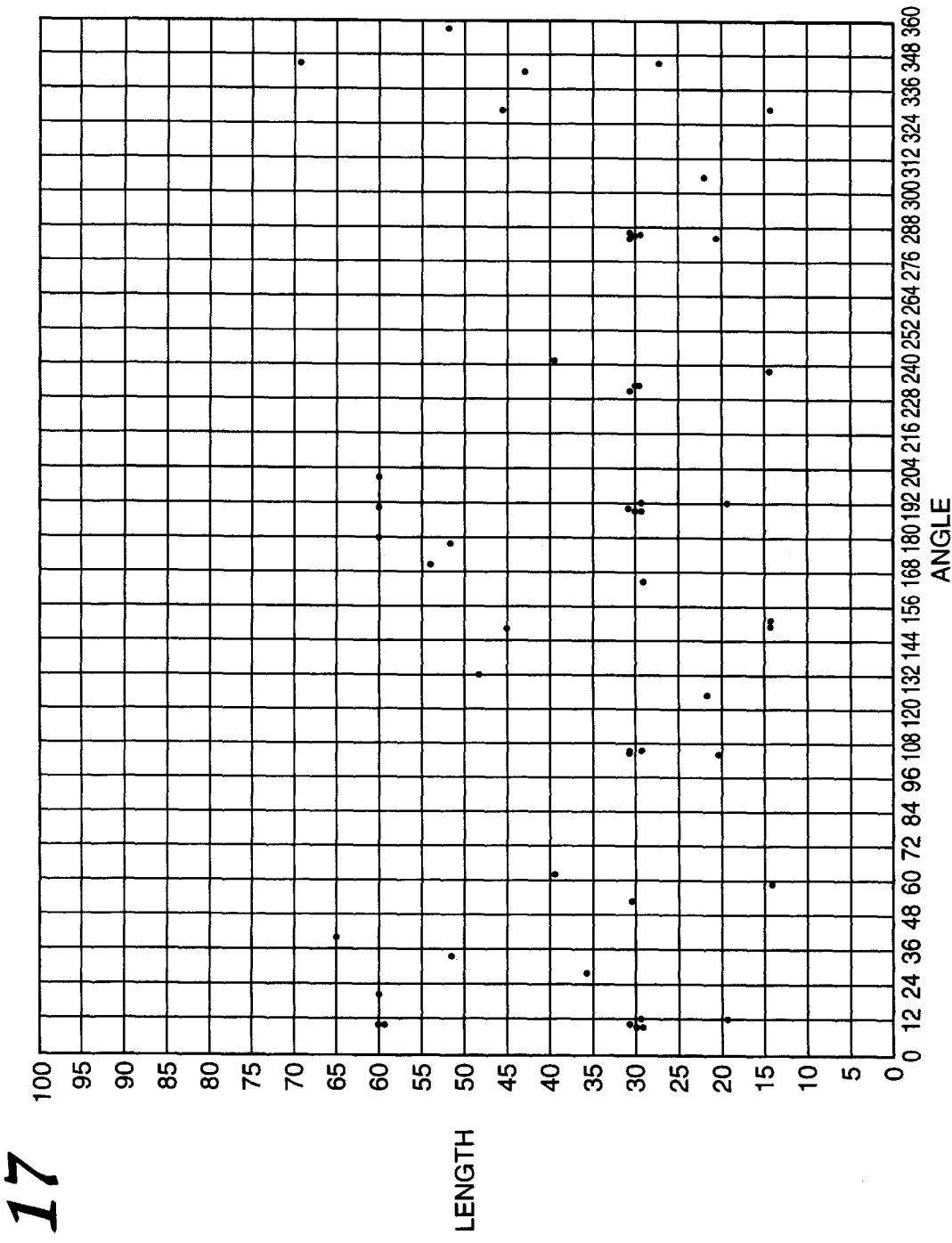
FIG. 17 is a histogram derived from the vectors of FIG. 15.
Figure 18:
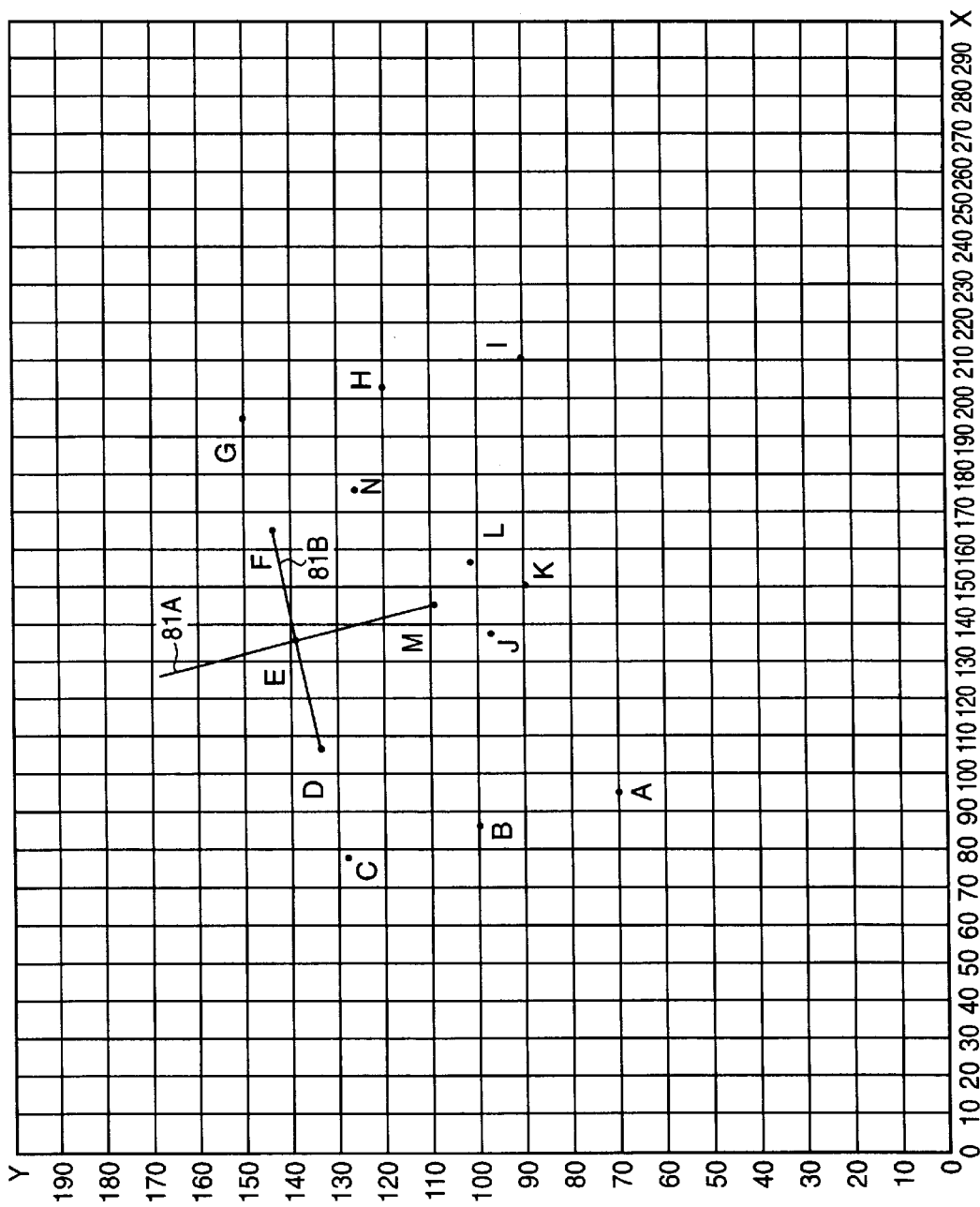
FIGS. 18–19, 21, 24–25 are diagrams of grids derived from the arrangement of FIG. 13.

For the purposes of the grid element producer 46, vectors that fall within angle and length tolerances of each other are considered instances of the same vector. For each possible pair of vectors in the set 44, the grid element producer 46 produces a grid element (step 2070). For each grid element (step 2080), a best-matching point is determined in the arrangement of points 26 (step 2090). The best-matching point is the point having the highest number of associated neighboring points that match positions defined by the grid element. For example, in the case of a grid element 79 (FIG. 15A) having vectors components based on vectors AB and CD ("vector pair AB/CD") of FIG. 15, the best-matching point in arrangement 74 is point E as shown in FIG. 18. This is so because when a different grid is started at each point using grid element 79 (e.g., for point E, a starting grid shown by line segments 81A and 81B that are twice the lengths of vectors AB and CD, respectively, and that cross at point E), point E is found to have the highest number of associated neighboring points (namely, three: points D, M, and F) that match positions defined by grid element 79. With respect to the other points, the corresponding number is only two for each of points B–D and F–H, and only one or zero for each of the remaining points.

Figure 19:
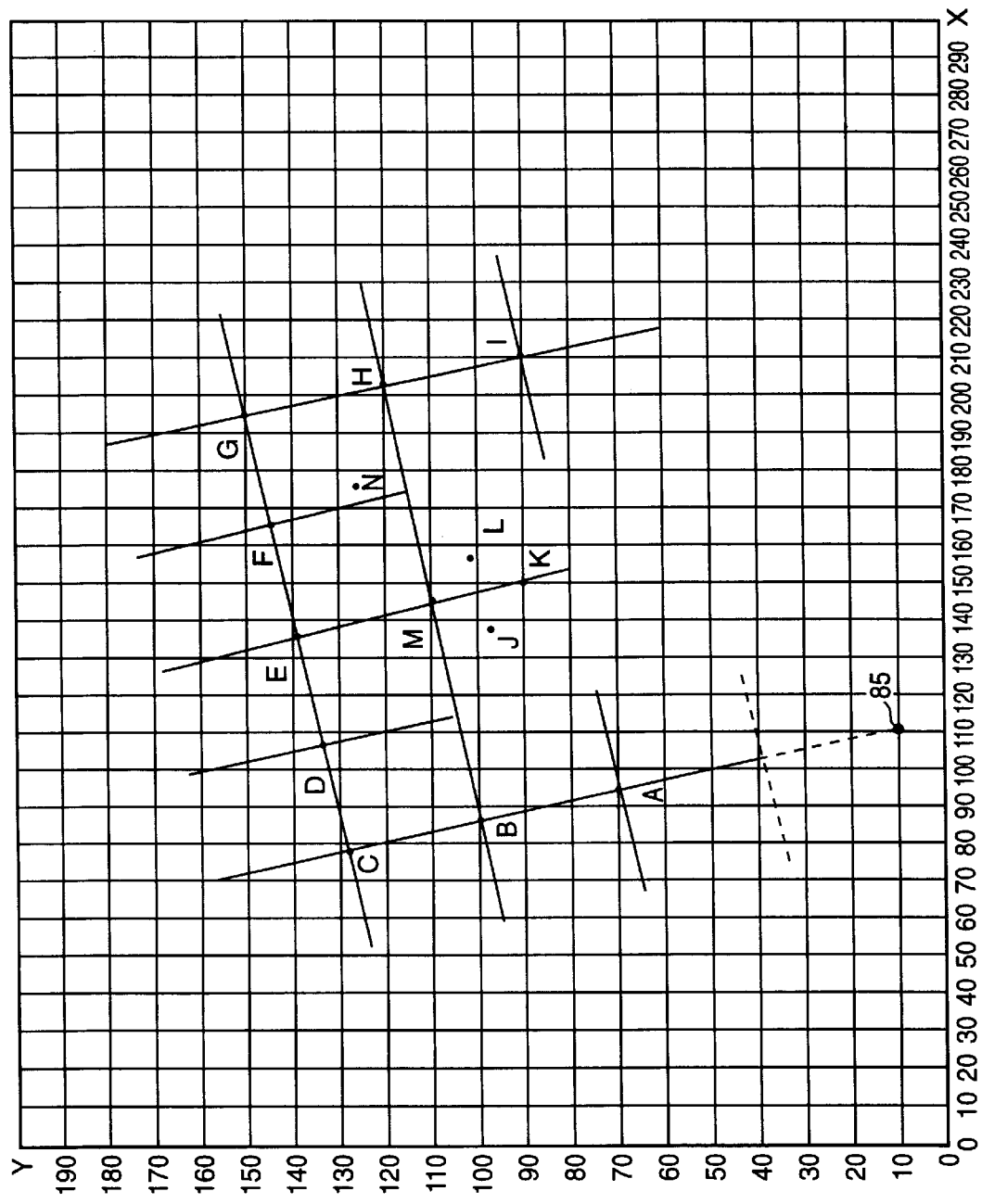
Figure 20:
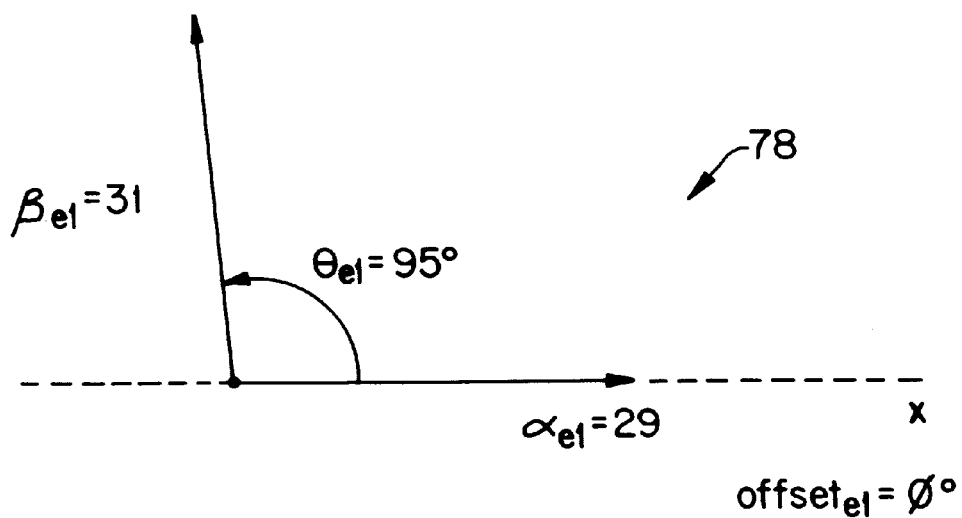
FIGS. 20, 23 are diagrams of refined grid elements derived from the arrangement of FIG. 13.
Figure 23:
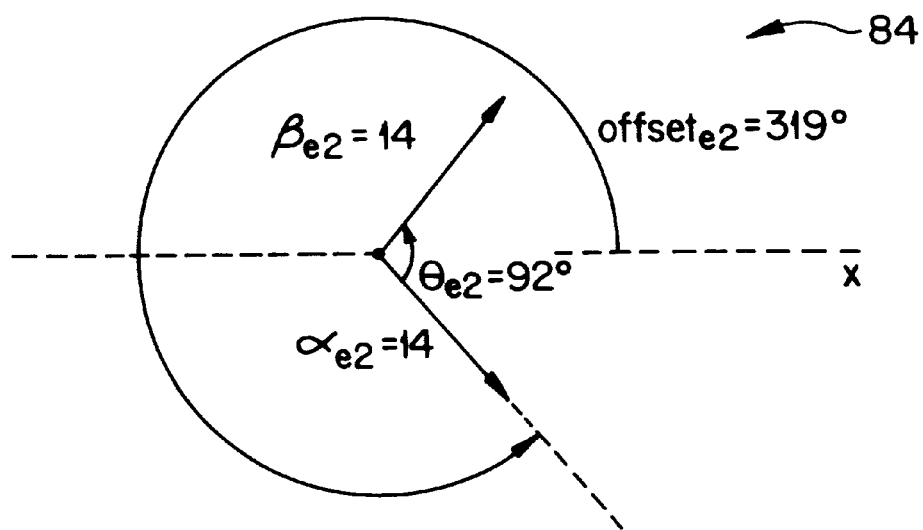
Figure 21:
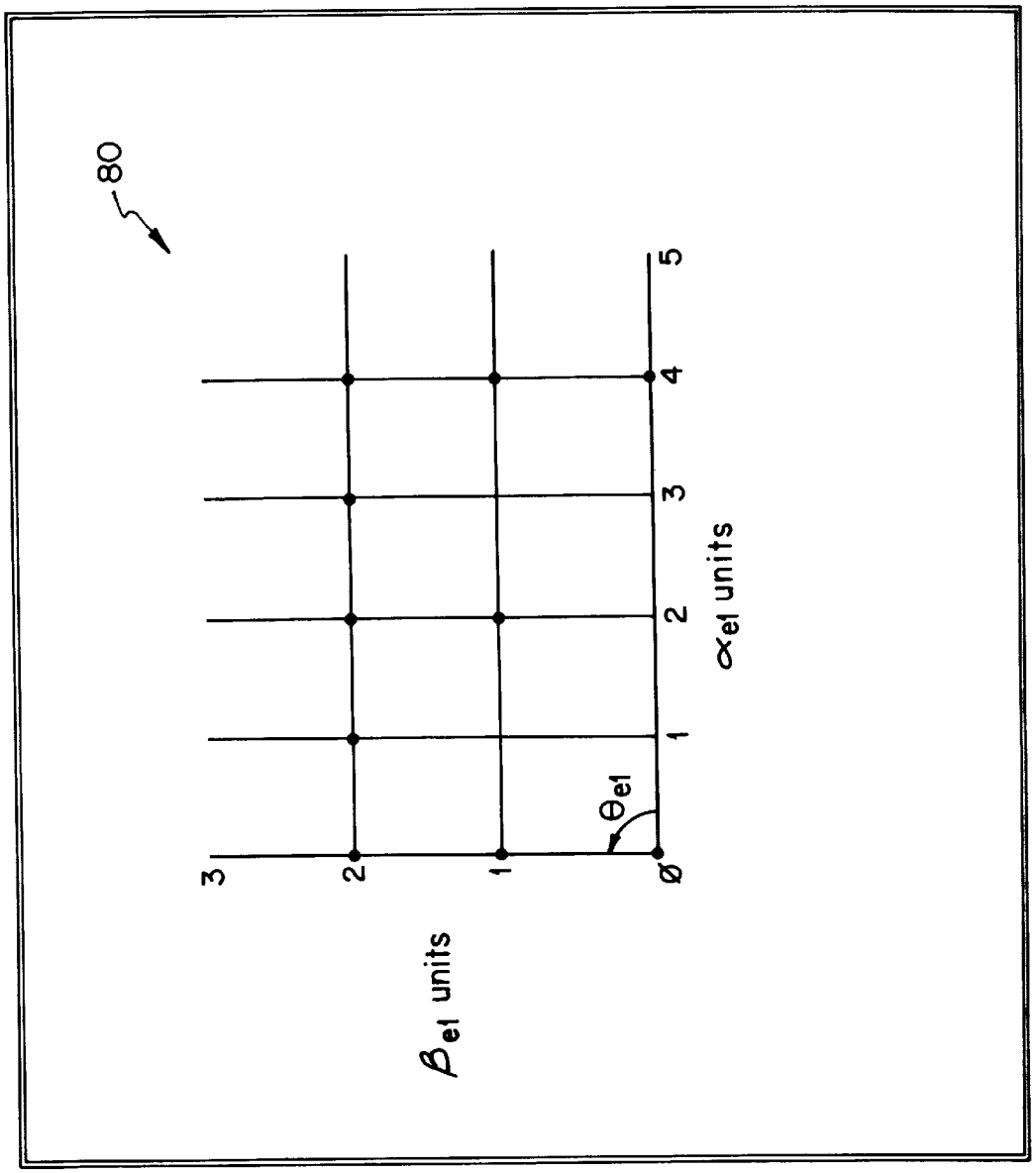
Figure 24:
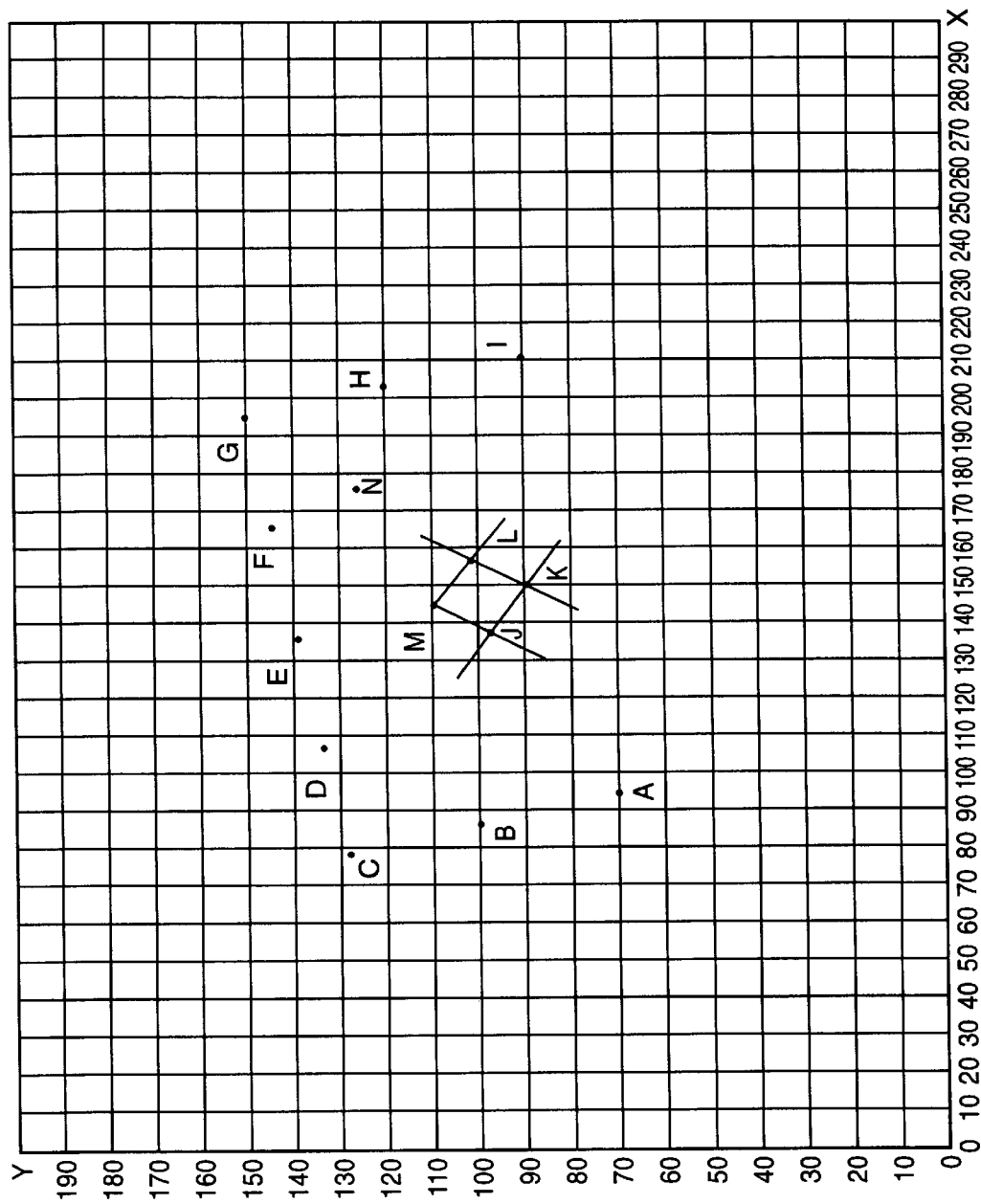
Figure 25:
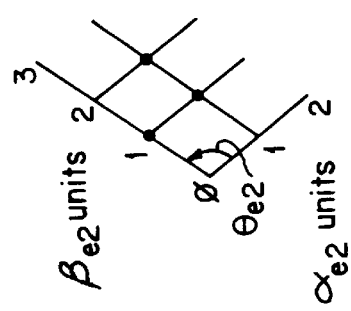

For each grid element, the grid producer and element refiner 50 uses the best-matching point as an origin for producing a corresponding grid (step 2100). As shown in FIG. 19 for the grid element based on vector pair AB/CD, the corresponding grid is produced by finding neighboring points that match positions defined by the grid element. A neighboring point so matches if the actual location of the neighboring point is within a distance tolerance (e.g., half the expected width of each discrete object) of the defined location.

As matching neighboring points are found, the grid element is refined to take into account differences between defined (i.e., expected) locations and the actual locations of the points found. The refinement may be based on any statistical combination of the differences, e.g., a linear combination such as an effective average of the differences, or a non-linear combination such as an effective root-mean-square combination of the differences.

For example, in the case of the initial grid element based on vector pair AB/CD using point E as an origin, an (x,y) location of (164,145) is defined for a neighboring point. In this case, since point F matches the defined location but has an actual (x,y) location of (165,144) (i.e., slightly below and to the right of the defined location), the grid element is altered so that the CD-based vector component of the grid element is shifted accordingly, i.e., to point slightly below and to the right of its original bearing. The difference between the defined and actual locations for point F may be represented as (164–165,145–144) or (–1,1).

As the corresponding grid is produced, the refined grid element is then used at each matching neighboring point found to find additional matching points, and is further refined as the additional matching points are found. How the refined grid element is further altered each time a difference is found depends on the nature of the combination used in the refinement, and perhaps (e.g., where an effective average serves as the combination) also on how many matching neighboring points were found previously in the refinement process. In general where the effective average is used, for an nth matching point associated with a vector component and a difference of (A,B), the orientation of the vector component is altered by the difference divided by (n+1), i.e., (A/(n+1),B/(n+1)). For instance, if a (5,5) difference is determined for a fourth matching point associated with a vector component, the orientation of the component is altered by (1,1), i.e., a fifth of the (5,5) difference. Thus, in the case of point F described above, if point F is the first matching point associated with the CD-based vector component (i.e., n=1 and n+1=2), the orientation of the CD-based vector component is altered by a difference of (–½,½), i.e., (–0.5,0.5). Dividing the difference by (n+1) allows each matching point to affect the vector component equally.

The refinement process may make use of a pseudo-inverse transform that represents the grid element and is altered as each matching point is found. Each matching point may or may not affect the grid element or vector component equally. In some applications, it may be advantageous to avoid accepting as matching an outlying matching point, i.e., a point that technically lines up with the grid element but is not an immediately neighboring point of any matching point already found. For example, if a point were located where indicated by reference numeral 85 in FIG. 19, the point would be an outlying matching point because it would line up with the grid as shown but would not be an immediately neighboring point of any matching point.

If a minimum number of matching points are not found as the corresponding grid is produced, the refined grid element and grid are rejected (step 2110).

From the set of refined grid elements so developed, the grid producer and element refiner 50 retains the refined grid element and corresponding grid (e.g., for arrangement 74, element 78 and grid 80 shown in FIGS. 20 and 21, respectively) having the highest number of associated matching points (step 2120). This first refined grid element and corresponding grid are retained in normalized form, i.e., a form that incorporates a rotational adjustment of the refined grid element and corresponding grid if necessary so that the a vector component is parallel to the x-axis.

The grid producer and element refiner 50 also records the locations of the matching points in an on-off table (e.g., for arrangement 74, table 82 shown in FIG. 22) corresponding to the refined grid element (step 2130). Thus, a refined version of the matching points portion of the arrangement can be created using only the refined grid element and the on-off table.

In iterations, ignoring the points already recorded in connection with any grid elements retained after previous iterations (e.g., by masking out such points), the grid producer and element refiner 50 produces additional retained grid elements and on-off tables for which the minimum number of matching points are found (e.g., as shown in FIGS. 23–26 for additional element 84 and table 86) (step 2140). As produced, the additional retained grid elements incorporate the same rotational adjustment (if any) that was necessary to retain the first retained grid element in normalized form as described above.

The positions of any remaining points in the arrangement (e.g., point N which was matched for neither element 78 nor element 84) are recorded, after the same rotational adjustment based on the first retained grid element (step 2150).

Thus, the image processing system 24 detects regular patterns represented in the digital image 36 and indicates the patterns by producing the grid elements and corresponding on-off tables.

The technique (i.e., the procedure described above) may be implemented in hardware or software, or a combination of both. In at least some cases, it is advantageous if the technique is implemented in computer programs executing on programmable computers that each include a processor, a storage medium readable by the processor (including volatile and non-volatile memory and/or storage elements), at least one input device such as a keyboard, and at least one output device. Program code is applied to data entered using the input device to perform the procedure described above and to generate output information. The output information is applied to one or more output devices.

In at least some cases, it is advantageous if each program is implemented in a high level procedural or object-oriented programming language such as Microsoft C or C++ to communicate with a computer system. The programs can be implemented in assembly or machine language, if desired. In any case, the language may be a compiled or interpreted language.

In at least some cases, it is advantageous if each such computer program is stored on a storage medium or device (e.g., ROM or magnetic diskette) that is readable by a general or special purpose programmable computer for configuring and operating the computer when the storage medium or device is read by the computer to perform the procedures described in this document. The system may also be considered to be implemented as a computer-readable storage medium, configured with a computer program, where the storage medium so configured causes a computer to operate in a specific and predefined manner.

Other embodiments are within the scope of the following claims. For example, the threshold determiner 40 may be based on circularity or bounding-box perimeters to expose discrete items of similar circularity or similar bounding-box perimeters. The arrangement analyzer 10 may refine the grid element by applying a formula that takes as inputs the points and the grid element's original vectors and angles. For example, the formula may specify determining for each point a difference between its expected and actual location, producing an average of the differences, and adjusting the grid element by the average. In cases where the arrangement includes more than one ideal pattern and each pattern is identified with a different size of discrete objects, the image processing system may check the size of a discrete object (e.g., by using a normalized correlation search) before associating the corresponding point with a particular pattern.

What is claimed is:

1. A method for analyzing a digital representation of an actual arrangement of discrete objects to identify respective positions of the discrete objects, the discrete objects having substantially similar shapes and sizes and being located among other objects, said method comprising:

said digital representation representing said actual arrangement with an array of pixels, each said pixel corresponding to a unique position along two spatial dimensions of the actual arrangement;

thresholding said digital representation in accordance with a chosen threshold to produce foreground and background pixels;

based on each of a plurality of thresholded digital representations using different respective given thresholds, selecting subsets of a priori foreground pixels, each said selected subset corresponding to a limited area which corresponds to the substantially similar sizes of said discrete objects;

comparing among said different respective given thresholds so as to determine said chosen threshold from among said different respective given thresholds so as to maximize a total number of said selected subsets; and forming an optimal thresholded digital representation by thresholding said digital representation using the chosen threshold, to identify respective positions of discrete objects represented by the selected subsets based upon the optimal thresholded digital representation.

2. The method according to claim 1, wherein each said selected subset comprises a set of contiguous ones of said foreground pixels.

3. The method according to claim 1, wherein said foreground pixels comprise pixels with values exceeding said chosen threshold.

4. The method according to claim 1, wherein the discrete objects comprise grid array balls on a surface mounted device being inspected.

* * * * *